(12) United States Patent
Kajihara et al.

(10) Patent No.: US 10,338,868 B2
(45) Date of Patent: Jul. 2, 2019

(54) APPARATUS, METHOD AND NON-TRANSITORY COMPUTER READABLE MEDIUM FOR DISPLAYING OMISSION INFORMATION TO PRINT SERIAL NUMBER

(71) Applicant: SEIKO EPSON CORPORATION, Tokyo (JP)

(72) Inventors: Mikihiro Kajihara, Matsumoto (JP); Akinori Tsuji, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/024,027

(22) Filed: Jun. 29, 2018

(65) Prior Publication Data

US 2019/0004756 A1 Jan. 3, 2019

(30) Foreign Application Priority Data

Jul. 3, 2017 (JP) ................. 2017-130568

(51) Int. Cl.
*G06F 3/12* (2006.01)
(52) U.S. Cl.
CPC .......... *G06F 3/1256* (2013.01); *G06F 3/1208* (2013.01)

(58) Field of Classification Search
None
See application file for complete search history.

(56) References Cited

FOREIGN PATENT DOCUMENTS

| JP | 06-115176 A | | 4/1994 |
|---|---|---|---|
| JP | 06115176 A | * | 4/1994 |
| JP | 10-217551 A | | 8/1998 |
| JP | 10217551 A | * | 8/1998 |

* cited by examiner

*Primary Examiner* — Andrew H Lam
(74) *Attorney, Agent, or Firm* — Foley & Lardner LLP

(57) ABSTRACT

A display control apparatus, when a display displays side by side a plurality of serial number elements with a predetermined regularity in order of serial number printing in which the plurality of serial number elements are printed in turn, includes a controller configured to replace at least two consecutive serial number elements from among the plurality of serial number elements excepting first and last serial number elements with omission information, which is a symbol or a character indicating omission of the at least two consecutive serial number elements, and to display the omission information on the display.

8 Claims, 20 Drawing Sheets

| | | | | D1 |
|---|---|---|---|---|
| SETTING AREA | | | | |
| TAPE WIDTH | 2 4 mm ▶ | 51 | LENGTH OF MARGINS | 3 ◆ mm 52 |
| NUMBER OF BLOCKS | 5 | 53 | LENGTH OF BLOCKS | 2 0 ◆ mm 54 |
| INITIAL VALUE | 1 | 55 | NUMBER OF REPETITIONS | 1 ◆ 56 |
| INCREMENT | 1 | 57 | MAXIMUM VALUE (MINIMUM VALUE) | □ 58 59 |

E1

PREVIEW DISPLAY AREA

| P1 | P2 | P3 | P4 | P5 |
|---|---|---|---|---|
| 1 | 2 | 3 | 4 | 5 |

Ib(I)

PRINT — 41
CANCEL — 42

APPARATUS, METHOD AND NON-TRANSITORY COMPUTER READABLE MEDIUM FOR DISPLAYING OMISSION INFORMATION TO PRINT SERIAL NUMBER

BACKGROUND

1. Technical Field

The disclosure relates to display control apparatuses that display serial number elements for serial number printing, printing apparatuses, methods of controlling display control apparatuses, and recording media.

2. Related Art

When performing serial number printing, some known tape printers display on a display serial number marks indicating insertion positions of serial numbers and details of the serial numbers instead of character strings serving as serial number elements. For example, in JP-A-10-217551, the details of the serial numbers include a value indicating the base of a numeral system of the serial numbers and the start and end values of the serial numbers.

However, in the case where the serial number marks and the details of the serial numbers alone are displayed as in JP-A-10-217551, users may not be able to grasp how a plurality of serial number elements are printed. For a better view, the entire serial number elements for serial number printing may be displayed in printing order. However, in a case where a display area in which the serial number elements are displayed is narrow for the number of serial number elements, the display size of the serial number elements may be insufficient. This may prevent the users from readily checking the order of the serial number elements.

SUMMARY

The disclosure provides a display control apparatus, a printing apparatus, a method of controlling a display control apparatus, and a non-transitory computer medium, which enable the order of serial number elements for serial number printing to be readily recognizable to users.

A display control apparatus according to the disclosure includes, when a display displays side by side a plurality of serial number elements with a predetermined regularity in order of serial number printing in which the plurality of serial number elements are printed in turn, a controller configured to replace at least two consecutive serial number elements from among the plurality of serial number elements excepting first and last serial number elements with omission information, which is a symbol or a character indicating omission of the at least two consecutive serial number elements, and to display the omission information on the display.

A printing apparatus according to the disclosure includes, when a display displays side by side a plurality of serial number elements with a predetermined regularity in order of serial number printing in which the plurality of serial number elements are printed in turn, a controller configured to replace at least two consecutive serial number elements from among the plurality of serial number elements excepting first and last serial number elements with omission information, which is a symbol or a character indicating omission of the at least two consecutive serial number elements, and to display the omission information on the display, and a printing unit configured to perform the serial number printing.

A method of controlling a display control apparatus includes displaying a plurality of serial number elements with a predetermined regularity on a display in order of serial number printing in which the plurality of serial number elements are printed in turn, replacing at least two consecutive serial number elements from among the plurality of serial number elements excepting first and last serial number elements with omission information, which is a symbol or a character indicating omission of the at least two consecutive serial number elements, and displaying the omission information on the display.

A non-transitory computer readable medium according to the disclosure stores a program for causing a computer to perform the method of controlling the display control apparatus.

According to a configuration of the disclosure, at least two consecutive serial number elements from among the plurality of serial number elements excepting the first and last serial number elements are replaced with the omission information, which is a symbol or a character indicating omission of the at least two consecutive serial number elements, when serial number printing is performed. This enables the serial number elements to be displayed in a display area that is narrow for the number of serial number elements without reducing the display size of the serial number elements, and thus allows the order of the serial number elements to be readily recognizable to users. The first and last serial number elements among the plurality of serial number elements are not replaced with the omission information (the first and last serial number elements are displayed by default). This allows the users to readily identify information including the start value (initial value) and the end value used for serial number printing. The symbol or the character of the omission information may be a plurality of symbols or a plurality of characters (character strings).

In the above-described display control apparatus, the controller may determine elements to be omitted to be replaceable with the omission information from among the plurality of serial number elements, based on serial number setting for the serial number printing.

According to this configuration, the elements to be omitted may be determined based on the serial number setting for serial number printing to allow the users to check the order of the serial number elements more readily.

In the above-described display control apparatus, in a case where there are N (where N is an integer satisfying N≥4) display positions arranged side by side in the display, the plurality of serial number elements being displayed at the respective display positions on a one-to-one basis, the controller may determine at least one display position at which the omission information is displayed out of the N display positions, based on the serial number setting, and may determine the elements to be omitted based on a determined display position.

According to this configuration, an appropriate display position of the omission information is determined based on the serial number setting for serial number printing, and the elements to be omitted are determined based on the determined display position. This enhances both the appearance of the serial number elements and the omission information S displayed side by side and the recognizability of the serial number elements.

In the above-described display control apparatus, in a case where the serial number setting causes the plurality of serial number elements to change cyclically, the controller may except the serial number elements included in the first cycle from the elements to be omitted.

According to this configuration, the serial number elements included in the first cycle of serial number printing are excepted from the elements to be omitted. This allows the users to readily check the periodicity of serial number printing.

In the above-described display control apparatus, in a case where there are N (where N is an integer satisfying $N \geq 4$) display positions arranged side by side in the display, the serial number elements being displayed at the respective display positions on a one-to-one basis, and the number M (where M is an integer satisfying $M \geq 2$) of the serial number elements satisfies $M > N$, the controller may replace the at least two serial number elements with the omission information, and may display the omission information on the display. In a case where $M \leq N$, the controller may display the entire M serial number elements on the display without displaying the omission information.

According to this configuration, in the case where the number of serial number elements is smaller than or equal to the number of display positions, the entire plurality of serial number elements are displayed without displaying the omission information. This enables as many serial number elements as possible to be displayed without reducing the display size of the serial number elements, and thus allows the order of the serial number elements to be recognizable to the users more readily.

In the above-described display control apparatus, the display may display an editing screen with which print data is edited. The editing screen may include a preview display screen configured to display a result of editing the print data as a print image. The controller may display the plurality of serial number elements on the preview display screen.

According to this configuration, the order of the serial number elements for serial number printing is readily recognizable to the users in the preview display screen in which an editing result of the print data is displayed as a print image.

In the above-described display control apparatus, the display may display an editing screen with which supplying data for data supply printing is edited. The editing screen may include a data creation screen with which the supplying data is created. The controller may display the plurality of serial number elements on the data creation screen.

According to this configuration, the order of the serial number elements for serial number printing is readily recognizable to the users in the data creation screen in which supplying data for data supply printing is created.

BRIEF DESCRIPTION OF THE DRAWINGS

The disclosure will be described with reference to the accompanying drawings, wherein like numbers reference like elements.

FIG. 6 illustrates a display example of the editing screen.

FIG. 12 illustrates a display example of the editing screen.

DESCRIPTION OF EXEMPLARY EMBODIMENTS

A display control apparatus, a printing apparatus, a method of controlling a display control apparatus, and a program for performing the method of controlling according to the disclosure will be described with reference to the accompanying drawings. In some exemplary embodiments, a personal computer (hereinafter referred to as "PC") is described as an example of a "display control apparatus".

Figure 1:
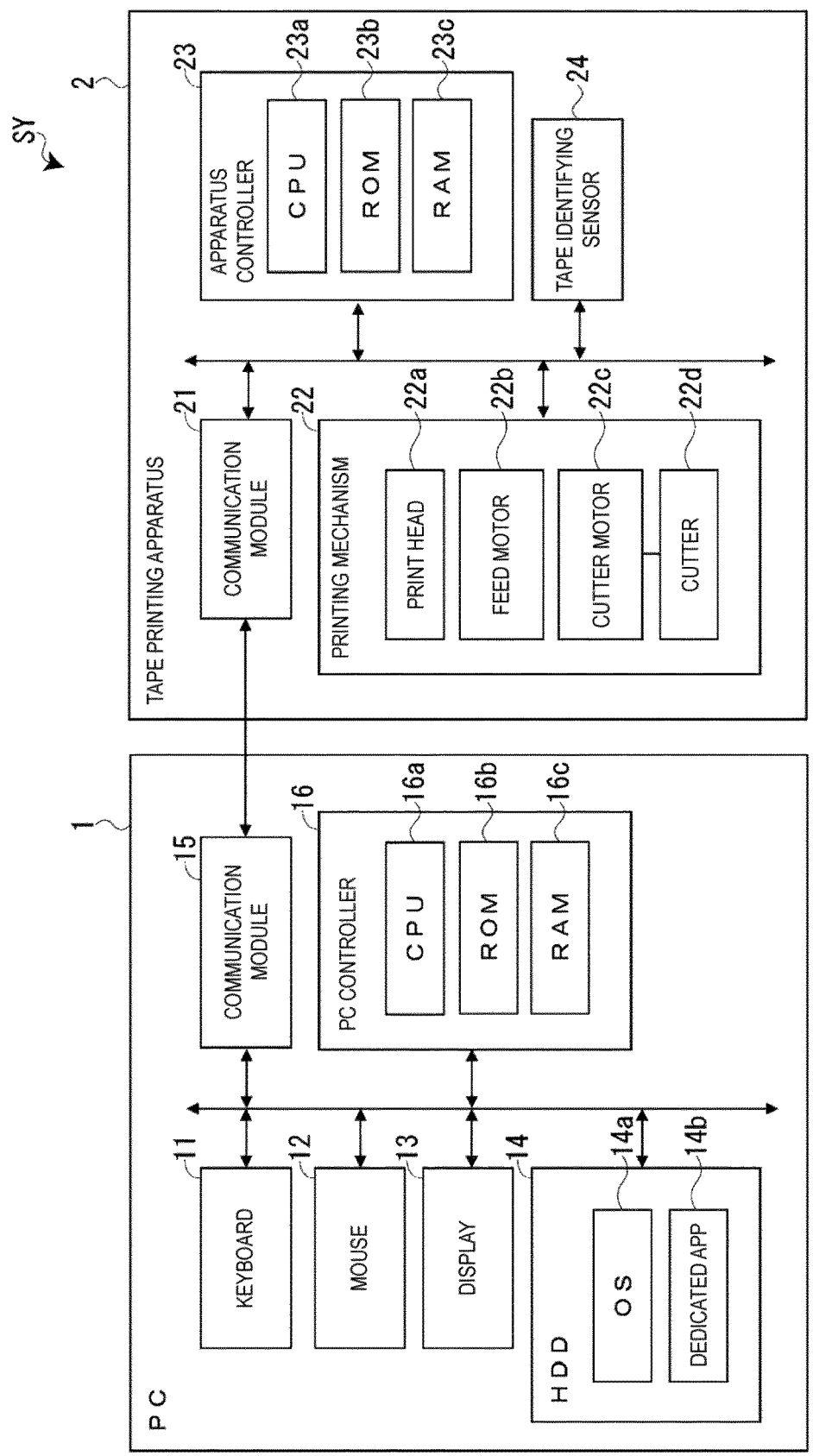
FIG. 1 is a block diagram illustrating a hardware configuration of a printing system SY according to one exemplary embodiment of the disclosure.

FIG. 1 is a block diagram illustrating a hardware configuration of a printing system SY according to one exemplary embodiment of the disclosure. The printing system SY includes a PC 1 and a tape printing apparatus 2. The PC 1 and the tape printing apparatus 2 are connected by a cable or through wireless communication. The PC 1 and the printing system SY may be connected through a network or on a one-to-one basis.

Figure 3:
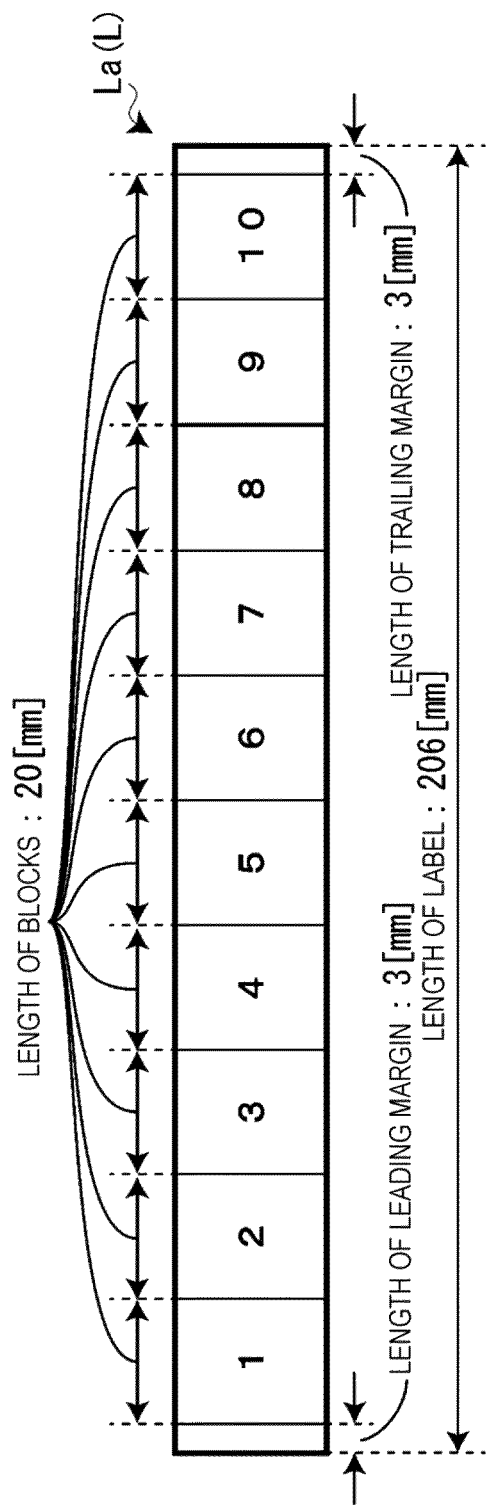
FIG. 3 illustrates an example of a patch panel label created based on the settings on the editing screen in FIG. 2.

The PC 1 generates print data for creating a label L (see, for example, FIG. 3). The tape printing apparatus 2 prints, based on the print data sent from the PC 1, on a tape serving as an example of a long printing medium to create the label L.

The PC 1 has a hardware configuration including a keyboard 11, a mouse 12, a display 13, a hard disk drive (HDD) 14, a communication module 15, and a PC controller 16. The PC controller 16 is an example of a "controller". The display 13 is an example of a "display".

The keyboard 11 and the mouse 12 are used as operating means that allow users to perform various operations. The display 13 is used as display means that display various information such as an editing screen D1 (see, for example, FIG. 2).

The HDD 14 is a backing storage, and stores an operating system (OS) 14*a*, a dedicated application (expressed as "dedicated app" in FIG. 1) 14*b*, and the like. The dedicated application 14*b* is an application for creating the label L in cooperation with the tape printing apparatus 2.

The communication module 15 is a module for communicating with the tape printing apparatus 2. In one exemplary embodiment, the communication module 15 is mainly used to send print data to and receive tape information from the tape printing apparatus 2 (described below).

The PC controller 16 includes a central processing unit (CPU) 16a, a read only memory (ROM) 16b, and a random access memory (RAM) 16c. The CPU 16a inputs signals to and outputs signals from units in the PC 1 to perform various operations. The ROM 16b stores various control programs and various control data. The RAM 16c is used as a working area for the CPU 16a.

The PC controller 16 executes processes such as displaying, print data generation, and print command execution based on the dedicated application 14b.

For example, the PC controller 16 drives the display 13 to display the editing screen D1 (see, for example, FIG. 2) for editing print data (displaying process). In one exemplary embodiment, the editing screen D1 for creating a patch panel label L (see FIG. 3) indicating port numbers on a patch panel is illustrated by example. To edit the patch panel label L, serial number setting for serial number printing is performed. Herein, the "serial number printing" indicates a function of printing a plurality of serial number elements with a predetermined regularity in turn (in the order of serial number elements). The serial number elements refer to, for example, numbers, alphabets, hiragana and katakana (Japanese phonetic alphabets), and decorative characters (circled numbers, outline alphabets, and the like). A plurality of characters (character strings) may also constitute the serial number elements.

The editing screen D1 includes a preview display area E2 in which an editing result of print data for the patch panel label L is displayed as a print image I. The preview display area E2 is an example of a "preview display screen". The PC controller 16 displays the print image I including a print image of the plurality of serial number elements for serial number printing arranged in the order of serial number printing and an image of the tape serving as the printing medium for the patch panel label L. In a case where a number M of serial number elements (hereinafter referred to as "element number M") is smaller than or equal to a maximum number N of display positions (hereinafter referred to as "maximum display number N") at which the serial number elements are displayed, the entire M serial number elements are displayed. Herein, M is an integer satisfying M≥2, and N is an integer satisfying N≥4. In a case where the element number M is larger than the maximum display number N, at least two consecutive serial number elements from among the M serial number elements excepting first and last serial number elements are replaced with omission information S indicating that display of the serial number elements is omitted. Details of the omission information S will be described below.

Figure 2:
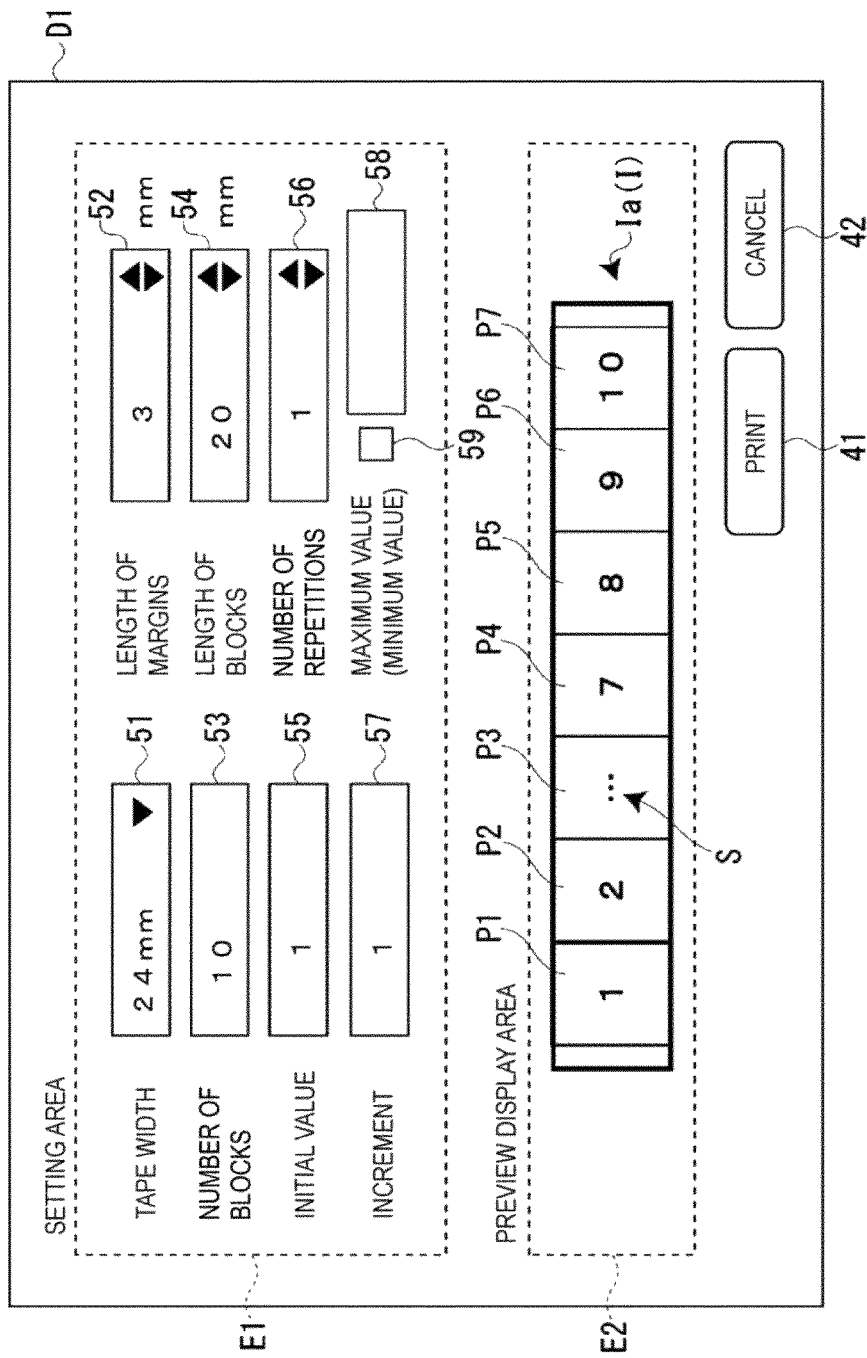
FIG. 2 illustrates a display example of an editing screen.

The "display positions" refer to areas sectioned by separator lines (vertical solid lines) in the print image I in the example illustrated in FIG. 2, and correspond to blocks of the patch panel label L (see reference sign P). As illustrated in FIG. 2, N display positions P1 to PN are arranged in a line, and the serial number elements are displayed at the respective display positions P1 to PN on a one-to-one basis. In FIG. 2, the maximum display number N=7.

The PC controller 16 generates print data for creating the label (patch panel label) L based on the editing result on the editing screen D1 (print data generation). In one exemplary embodiment, the print data includes various control signals such as a command to cut the tape in addition to image data indicating the print image to be printed on the tape.

The PC controller 16 sends to the tape printing apparatus 2 the print data generated during the print data generation based on print command operations (selection of a print button 41; see, for example, FIG. 2) on the editing screen D1 (print command execution).

The tape printing apparatus 2 has a hardware configuration including a communication module 21, a printing mechanism 22, an apparatus controller 23, and a tape identifying sensor 24. The printing mechanism 22 is an example of a "printing unit".

The communication module 21 is a module for communicating with the PC 1, and is used, for example, to receive print data and send tape information.

The printing mechanism 22 includes a print head 22a, a feed motor 22b, a cutter motor 22c, and a cutter 22d to print based on the print data received from the PC 1. The print head 22a faces a feed path from a tape accommodating section accommodating a tape to a discharge port discharging the tape to print onto the tape while the tape is being fed. The feed motor 22b is a driving source for feeding the tape along the feed path. The cutter motor 22c is a driving source that drives the cutter 22d. The cutter 22d cuts the tape in a width direction of the tape to separate printed parts after printing. A rectangular label L is created by cutting the tape in this manner.

The apparatus controller 23 includes a CPU 23a, a ROM 23b, and a RAM 23c. The CPU 23a inputs signals to and outputs signals from units in the tape printing apparatus 2 to perform various operations. The ROM 23b stores control programs such as firmware and various control data. The RAM 23c is used as a working area for the CPU 23a.

The tape identifying sensor 24 detects tape information such as width and color of the tape. In a case where a tape cartridge accommodating a tape is installed in the tape printing apparatus 2, for example, the tape information may be detected by reading an image (such as a barcode or a two-dimensional code) or a radio frequency identification (RFID) tag stuck or printed on the tape cartridge or by detecting the existence of one or more holes in the tape cartridge. In a case where a tape (or a tape reel onto which a tape is wound) is directly installed in the tape printing apparatus 2, tape width may be detected using, for example, an infrared sensor.

The apparatus controller 23 sends the tape information detected by the tape identifying sensor 24 to the PC 1. The tape information may be sent on startup of the tape printing apparatus 2 or during replacement of the tape. The tape information may be sent in response to an information acquisition command received from the PC 1. The PC 1 may send the information acquisition command on startup of the dedicated application 14b or when a predetermined operation is performed on the dedicated application 14b.

Next, the editing screen D1 will be described with reference to FIG. 2. The editing screen D1 includes a setting area E1, the preview display area E2, the print button 41, and a cancel button 42. In FIG. 2, borders of the setting area E1 and the preview display area E2 are indicated by broken lines. Solid lines or no borders may be used to indicate the setting area E1. However, to indicate that the preview display area E2 is a limited area, the preview display area E2 may be displayed to be distinguishable from other areas in the editing screen D1. For example, background color of the preview display area E2 may be different from background color of the editing screen D1.

In the setting area E1, a tape width display and selecting field 51, a margin length setting field 52, a block number setting field 53, a block length setting field 54, an initial value setting field 55, a repetition number setting field 56, an increment setting field 57, and a maximum or minimum value setting field 58 are displayed.

The tape width sent as tape information from the tape printing apparatus 2 is displayed in the tape width display and selecting field 51. The users may change the tape width in the tape width display and selecting field 51 to any value. After changing the value, the users place a tape (or a tape cartridge) with the specified tape width in the tape accommodating section of the tape printing apparatus 2.

A length of margins left at a leading end and at a trailing end of the label L in a longitudinal direction of the tape is set in the margin length setting field 52. The length of the margins is set by selecting an upward pointing triangle or a downward pointing triangle in the margin length setting field 52 to increase or decrease the numerical value or by directly inputting a numerical value. In one exemplary embodiment, the length of the leading margin left at the leading end of the label L and the length of the trailing margin left at the trailing end of the label L are identical (see FIG. 3). However, the lengths may be independently set.

The number of blocks of the patch panel label L is set in the block number setting field 53. As described above, since the patch panel label L is created using the serial number printing function, the number of blocks set in the block number setting field 53 corresponds to the element number M. Thus, the element number M is also referred to as "block number M". The number of blocks set in the block number setting field 53 is one of the serial number settings.

A length of each block of the patch panel label L in the longitudinal direction of the tape is set in the block length setting field 54. The length of the blocks is set by selecting an upward pointing triangle or a downward pointing triangle in the block length setting field 54 to increase or decrease the numerical value or by directly inputting a numerical value. The blocks are identical in length (see FIG. 3).

An initial value, which is one of the serial number settings, is set in the initial value setting field 55. Instead of a natural number, a character or a symbol such as zero, a decimal, or a negative number may be set as the initial value.

The number of repetitions, which is one of the serial number settings, is set in the repetition number setting field 56. The number of repetitions indicates how many times a specific serial number element is printed. For example, in a case where the number of repetitions is 2 and the initial value is 1, the serial number elements are arranged in the order of "1, 1, 2, 2, . . . ". A natural number may be set as the number of repetitions.

An increment, which is one of the serial number settings, is set in the increment setting field 57. The increment is a numerical value indicating a difference between adjacent serial number elements. For example, in a case where the increment is 2 and the initial value is 1, the serial number elements are arranged in the order of "1, 3, 5, 7, . . . ". In addition to a natural number, a decimal or a negative number may be set as the increment.

A maximum value or a minimum value, which is one of the serial number settings, is set in the maximum or minimum value setting field 58. The maximum value or the minimum value is an optional serial number setting, and the maximum or minimum value setting field 58 may be left blank as in the example in FIG. 2. In a case where the maximum value or the minimum value is set, a setting enabling field 59 is first set to "enable" (filled in; see FIG. 10) to input a numerical value in the maximum or minimum value setting field 58. As in the case of the initial value, a character or a symbol such as zero, a decimal, a negative number, or an alphabet may be set as the maximum value or the minimum value.

The print image I corresponding to the print data generated based on the set values in the setting area E1 is displayed in the preview display area E2. The PC controller 16 determines the display size of the print image I based on the tape width displayed in the tape width display and selecting field 51 to maximize the size of the tape image in a vertical direction of the preview display area E2. The PC controller 16 also determines the maximum display number N, which is a maximum number of serial number elements displayable in the print image I (a maximum number of display positions P), based on the length of the margins set in the margin length setting field 52 and the length of the blocks set in the block length setting field 54. For example, the maximum display number N increases as the length of the margins and the length of the blocks decrease. In one exemplary embodiment, the length of the margins and the length of the blocks are fixed, and the maximum display number N is set at 7. In the case where the block number M is smaller than or equal to the maximum display number N, the PC controller 16 displays the entire serial number elements.

In a case where the block number M is larger than the maximum display number N, the PC controller 16 replaces at least two consecutive serial number elements from among the M serial number elements excepting the first and last serial number elements with the omission information S, which is a symbol or a character indicating omission of the serial number elements, and displays the omission information S. In one exemplary embodiment, a horizontal ellipsis ( . . . ) is displayed as an example of the omission information S. Based on the serial number settings (set values such as the number of blocks, the initial value, the number of repetitions, the increment, and the maximum value or the minimum value) for serial number printing, the PC controller 16 determines at least one display position P at which the omission information S is displayed (hereinafter referred to as "omitted element position") from among the N display positions P1 to PN, and determines elements to be omitted (the serial number elements replaceable with the omission information S) based on the omitted element position determined above. A process of determining the omitted element position (hereinafter referred to as "omitted element position determination process") will be described below. In a case where the maximum display number N is 3 and the block number M is larger than the maximum display number N, the PC controller 16 determines the second display position P2 in the print image I as the omitted element position regardless of the serial number settings.

In a case where the block number M is larger than the maximum display number N and the omitted element position is G, the PC controller 16 determines that (M−N+1) serial number elements from Gth to (G+M−N)th serial number elements will be omitted. Herein, the omitted element position is a number indicating one of the first to Nth display positions P1 to PN when the maximum display number is N, and G is an integer 2 or N−1.

When the print button 41 is selected in the editing screen D1, the PC controller 16 generates print data based on the settings in the setting area E1, and sends the print data to the tape printing apparatus 2. When the cancel button 42 is selected, the PC controller 16 cancels the setting in the setting area E1, and hides the editing screen D1.

FIG. 3 illustrates a patch panel label La created based on the settings on the editing screen D1 (the setting area E1) in FIG. 2. As illustrated in FIG. 3, the length of the leading margin from the leading end of the patch panel label La to the print start position is 3 mm, and the length of the trailing margin from the print end position to the trailing end of the patch panel label La is 3 mm. The length of the label from the leading end to the trailing end of the patch panel label La is 206 mm according to a mathematical expression "(the length of the blocks 20 mm×the number of blocks 10)+the length of the leading margin 3 mm+the length of the trailing margin 3 mm". A print image including a plurality of serial number elements ("1, 2, 3, 4, 5, 6, 7, 8, 9, 10" in the example in FIG. 2) respectively placed in the ten blocks of the patch panel label La based on the serial number settings on the editing screen D1 in FIG. 2 is printed on the patch panel label La.

FIG. 3 illustrates the patch panel label L including the blocks sectioned by the solid lines. However, separator lines other than the solid lines or no separator lines may be printed.

Next, a flow of the omitted element position determination process performed by the PC 1 will be described with reference to the flowcharts in FIGS. 4 and 5. The PC 1 (PC controller 16) acquires the serial number settings (the number of blocks, the initial value, the number of repetitions, the increment, and the maximum value or the minimum value) for serial number printing set in the editing screen D1 (S01), and determines whether the block number (element number) M>the maximum display number N (S02). In the case where the block number M the maximum display number N (No in S02), it is determined that the omission information S is not displayed (S03), and the omitted element position determination process ends.

In the case where the block number M>the maximum display number N (Yes in S02), the PC controller 16 determines whether the maximum value or the minimum value is set (S04). In a case where the maximum value or the minimum value is not set (No in S04), it is determined whether the value of a mathematical expression A "the number of repetitions+2" is smaller than the maximum display number N (S05). In a case where the value of the mathematical expression A is smaller than maximum display number N, the process proceeds to S09 in FIG. 5. In a case where the value of the mathematical expression A is larger than or equal to the maximum display number N (No in S05), the position given by the maximum display number N−1 is determined as the omitted element position (S06). Since N=7 in one exemplary embodiment, the sixth display position P6 is determined as the omitted element position.

In a case where the maximum value or the minimum value is set (Yes in S04), the PC controller 16 determines whether the value of at least one of the mathematical expressions A, B, or C is smaller than the maximum display number N (S07). Herein, the mathematical expression B is "|the maximum value or the minimum value−the initial value|/|the increment|+3", and the mathematical expression C is "(|the maximum value or the minimum value−the initial value|/|the increment|+1)×the number of repetitions+2". In a case where the value of the mathematical expression B or C includes a fractional part as a result of division, the fractional part is discarded. In a case where it is No in S07, the PC controller 16 determines the position given by the maximum display number N−1 as the omitted element position (S06). In a case where it is Yes in S07, the process proceeds to S08 in FIG. 5.

Figure 5:
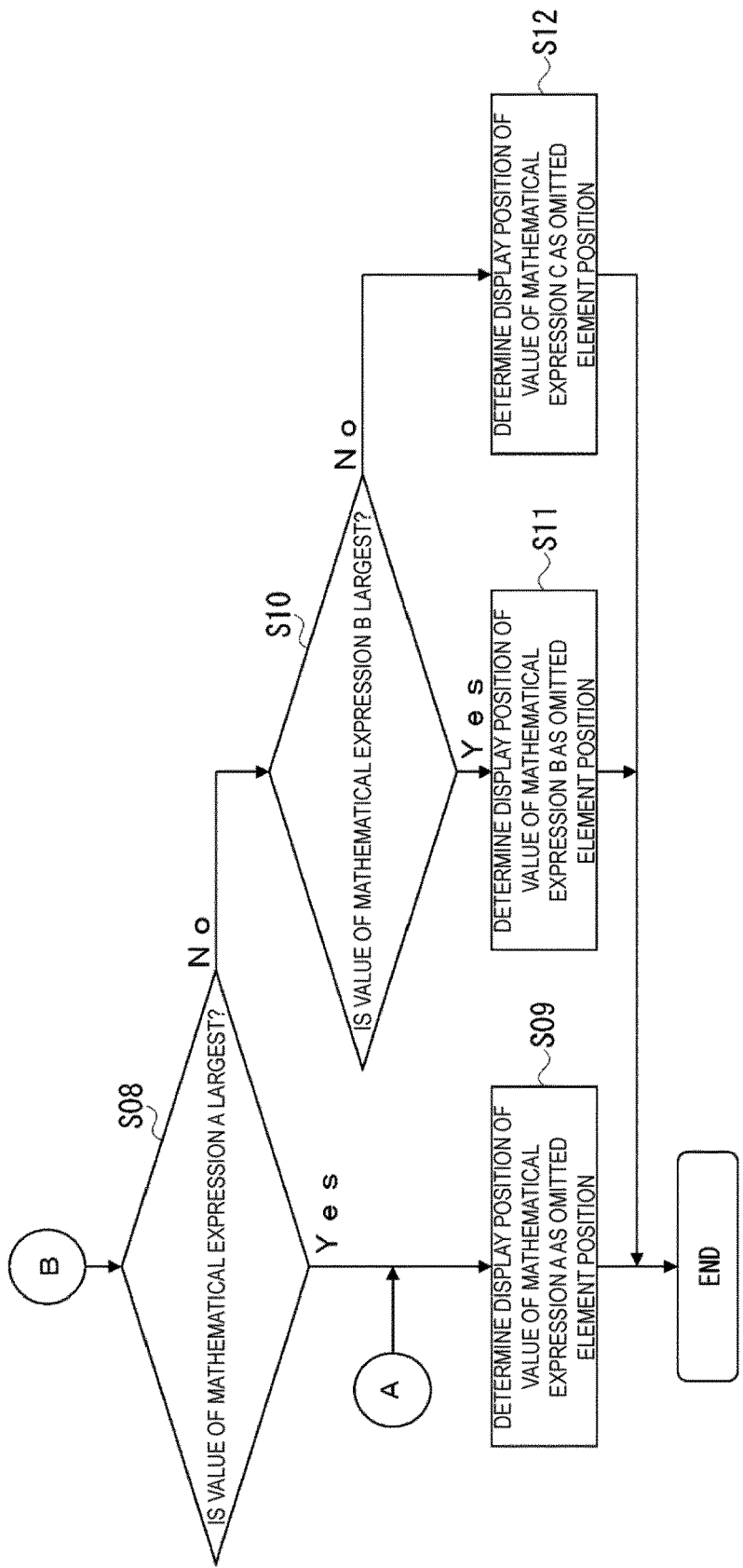
FIG. 5 is a flowchart subsequent to the flowchart in FIG. 4.

As illustrated in FIG. 5, the PC controller 16 determines the omitted element position using the largest value obtained from the mathematical expressions A, B, and C. Specifically, the PC controller 16 first determines whether the value of the mathematical expression A is the largest of the values of the mathematical expressions A, B, and C (S08). In a case where it is Yes in S08, the display position P obtained from the value of the mathematical expression A is determined as the omitted element position (S09), and the omitted element position determination process ends. In a case where it is No in S08, the PC controller 16 determines whether the value of the mathematical expression B is the largest of the values of the mathematical expressions A, B, and C (S10). In a case where it is Yes in S10, the display position P obtained from the value of the mathematical expression B is determined as the omitted element position (S11), and the omitted element position determination process ends. In a case where it is No in S10, the PC controller 16 determines the display position P obtained from the value of the mathematical expression C as the omitted element position (S12), and the omitted element position determination process ends.

In the example in FIG. 2, the serial number settings for serial number printing are as follows: the number of blocks: 10, the initial value: 1, the number of repetitions: 1, the increment: 1, and the maximum value or the minimum value: not set. Thus, the serial number elements for serial number printing are arranged in the order of "1, 2, 3, 4, 5, 6, 7, 8, 9, 10" (see the patch panel label La in FIG. 3), and the block number M is larger than the maximum display number N (Yes in S02 in FIG. 4). Since the maximum value or the minimum value is not set (No in S04), the value of the mathematical expression A is calculated. Since the value of the mathematical expression A is 3 (Yes in S05), the omitted element position is determined as 3 (S09). Thus, the PC controller 16 displays the omission information S at the third display position P3 among the seven display positions P1 to P7, and respectively displays the first, second, and seventh to tenth serial number elements at the first, second, and fourth to seventh display positions P1, P2, and P4 to P7 in a print image Ia in the preview display area E2. That is, the third to sixth serial number elements are omitted in the example in FIG. 2.

Next, display examples of the editing screen D1 other than FIGS. 2 and 3 and examples of labels created based on the settings on the editing screen D1 will be described with reference to FIGS. 6 to 19.

FIG. 6 illustrates a display example of the editing screen D1 in a case where the serial number settings for serial number printing are as follows: the number of blocks: 5, the initial value: 1, the number of repetitions: 1, the increment: 1, and the maximum value or the minimum value: not set. In this case, the plurality of serial number elements for serial number printing are arranged in the order of "1, 2, 3, 4, 5". In the case where the block number M the maximum display number N as above, the PC controller 16 determines that the omission information S is not displayed (see No in S02 and S03 in FIG. 4). Thus, a print image Ib including the entire plurality of serial number elements "1, 2, 3, 4, 5" is displayed in the preview display area E2.

Figure 7:
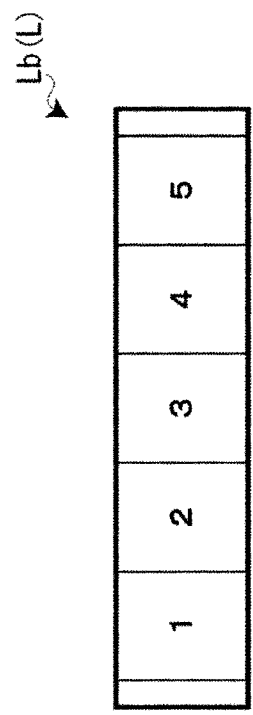
FIG. 7 illustrates an example of a patch panel created based on the settings on the editing screen in FIG. 6.

FIG. 7 illustrates an example of a patch panel label Lb created based on the settings on the editing screen D1 in FIG. 6. A print image including the plurality of serial number elements "1, 2, 3, 4, 5" respectively placed in five blocks of the patch panel label Lb is printed on the patch panel label Lb.

Figure 8:
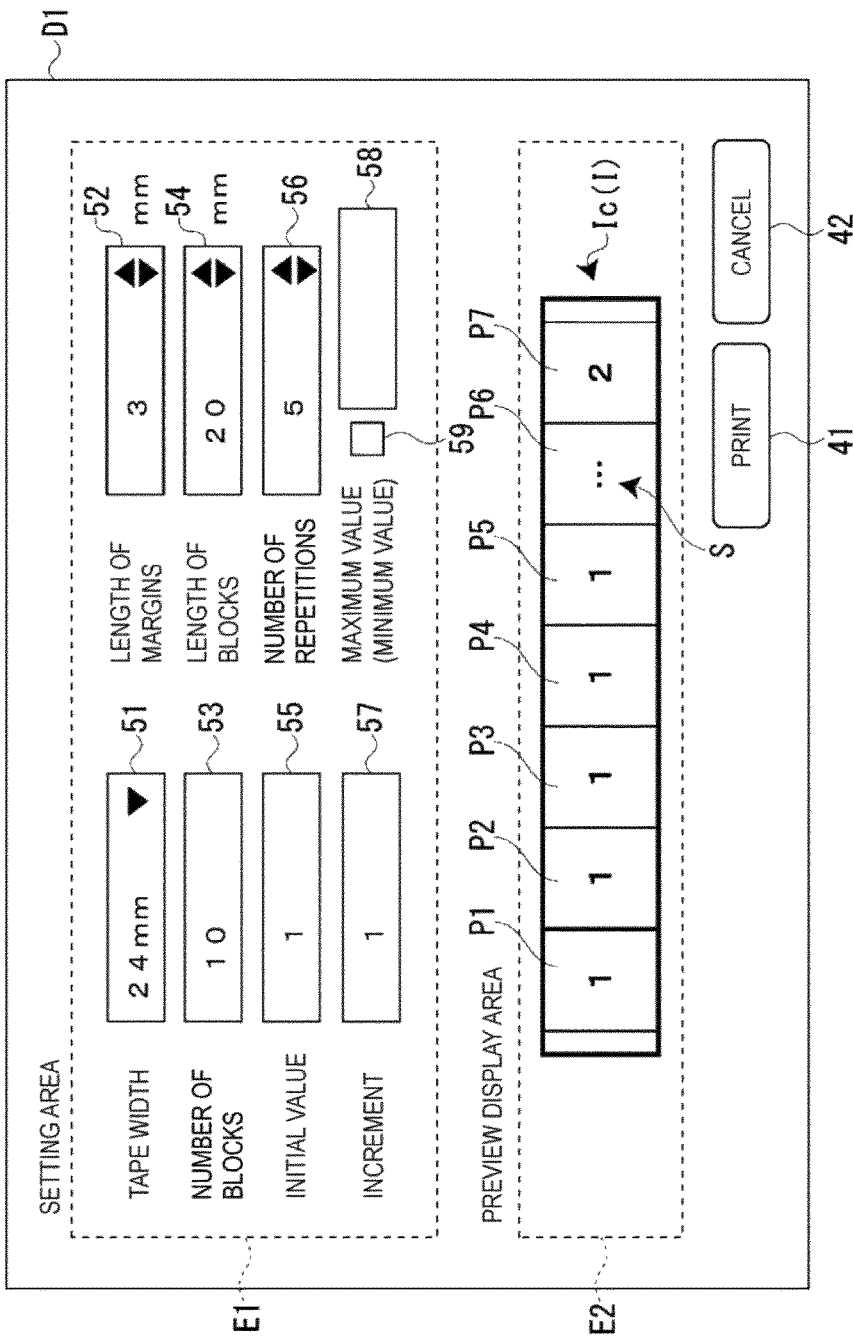
FIG. 8 illustrates a display example of the editing screen.

FIG. 8 illustrates a display example of the editing screen D1 in a case where the serial number settings for serial number printing are as follows: the number of blocks: 10, the initial value: 1, the number of repetitions: 5, the increment: 1, and the maximum value or the minimum value: not set. In this case, the plurality of serial number elements for serial number printing are arranged in the order of "1, 1, 1, 1, 1, 2, 2, 2, 2, 2". In the case where the block number M>maximum display number N (Yes in S02 in FIG. 4), the maximum value or the minimum value is not set (No in S04), and the value of the mathematical expression A the maximum display number N (No in S05 and S06) as above, the PC controller 16 determines the position of the maximum display number N−1 as the omitted element position. Since N=7 in one exemplary embodiment, the sixth display position P6 among the seven display positions P1 to P7 in a print image Ic is determined as the omitted element position in the example in FIG. 8. Moreover, the PC controller 16 respectively displays the first to fifth and tenth serial number elements at the first to fifth and seventh display positions P1 to P5 and P7. That is, the sixth to ninth serial number elements are omitted in the example in FIG. 8.

Figure 9:
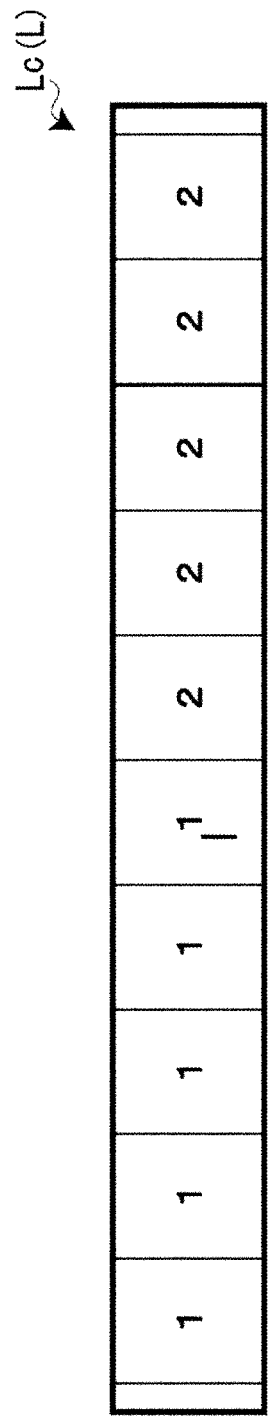
FIG. 9 illustrates an example of a patch panel created based on the settings on the editing screen in FIG. 8.

FIG. 9 illustrates an example of a patch panel label Lc created based on the settings on the editing screen D1 in FIG. 8. A print image including the plurality of serial number elements "1, 1, 1, 1, 1, 2, 2, 2, 2, 2" respectively placed in ten blocks of the patch panel label Lc is printed on the patch panel label Lc.

Figure 10:
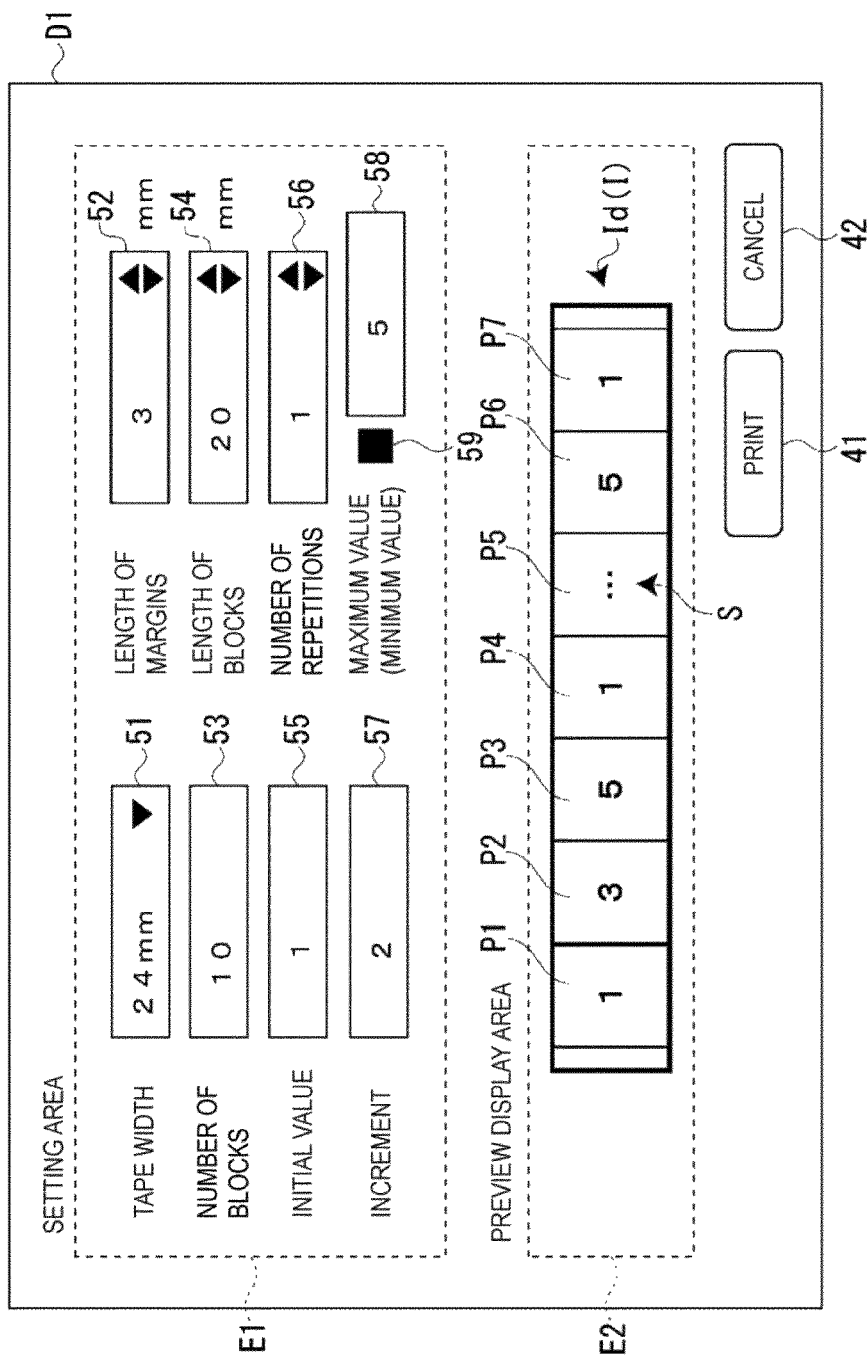
FIG. 10 illustrates a display example of the editing screen.

FIG. 10 illustrates a display example of the editing screen D1 in a case where the serial number settings for serial number printing are as follows: the number of blocks: 10, the initial value: 1, the number of repetitions: 1, the increment: 2, and the maximum value or the minimum value: 5. In this case, the plurality of serial number elements for serial number printing are arranged in the order of "1, 3, 5, 1, 3, 5, 1, 3, 5, 1". In the case where the block number M>the maximum display number N (Yes in S02 in FIG. 4) and the maximum value or the minimum value is set (Yes in S04) as above, the PC controller 16 calculates the mathematical expressions A, B, and C (S07). In the case where at least one of the values of the mathematical expressions A, B, or C is smaller than the maximum display number N (Yes in S07), the omitted element position is determined using the largest value obtained from the mathematical expressions A, B, and C (see FIG. 5). In the example in FIG. 10, the values of the mathematical expressions A, B, and C are respectively 3, 5, and 5. Thus, the omitted element position is determined as 5. Consequently, the PC controller 16 displays the omission information S at the fifth display position P5 among the seven display positions P1 to P7, and respectively displays the first to fourth, ninth, and tenth serial number elements at the first to fourth, sixth, and seventh display positions P1 to P4, P6, and P7 in a print image Id in the preview display area E2. That is, the fifth to eighth serial number elements are omitted in the example in FIG. 10.

Herein, the mathematical expressions B and C are determined by subtracting the initial value from the maximum value or the minimum value, by dividing the absolute value of the resultant value by the absolute value of the increment, and then by adding at least 3 to the quotient. In a case where the serial number settings cause the plurality of serial number elements to change cyclically, the serial number elements included in a first cycle are excepted from the elements to be omitted. FIG. 10 is an example of the serial number settings that cause the plurality of serial number elements to change cyclically. In FIG. 10, the serial number elements in one cycle, "1, 3, 5", are repeated three times.

Figure 11:
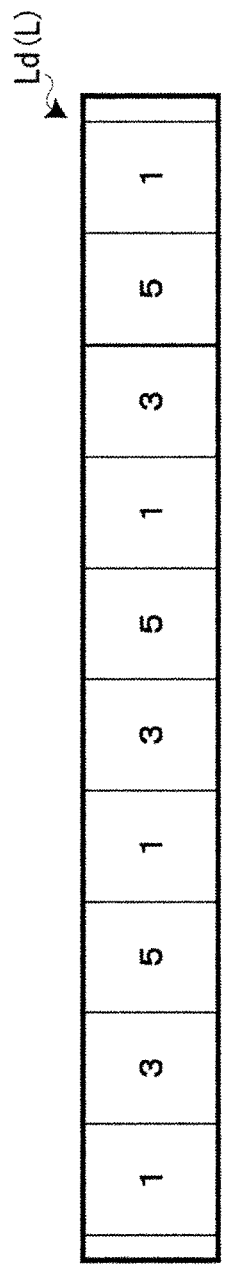
FIG. 11 illustrates an example of a patch panel created based on the settings on the editing screen in FIG. 10.

FIG. 11 illustrates an example of a patch panel label Ld created based on the settings on the editing screen D1 in FIG. 10. A print image including the plurality of serial number elements "1, 3, 5, 1, 3, 5, 1, 3, 5, 1" respectively placed in ten blocks of the patch panel label Ld is printed on the patch panel label Lc.

Figure 12:
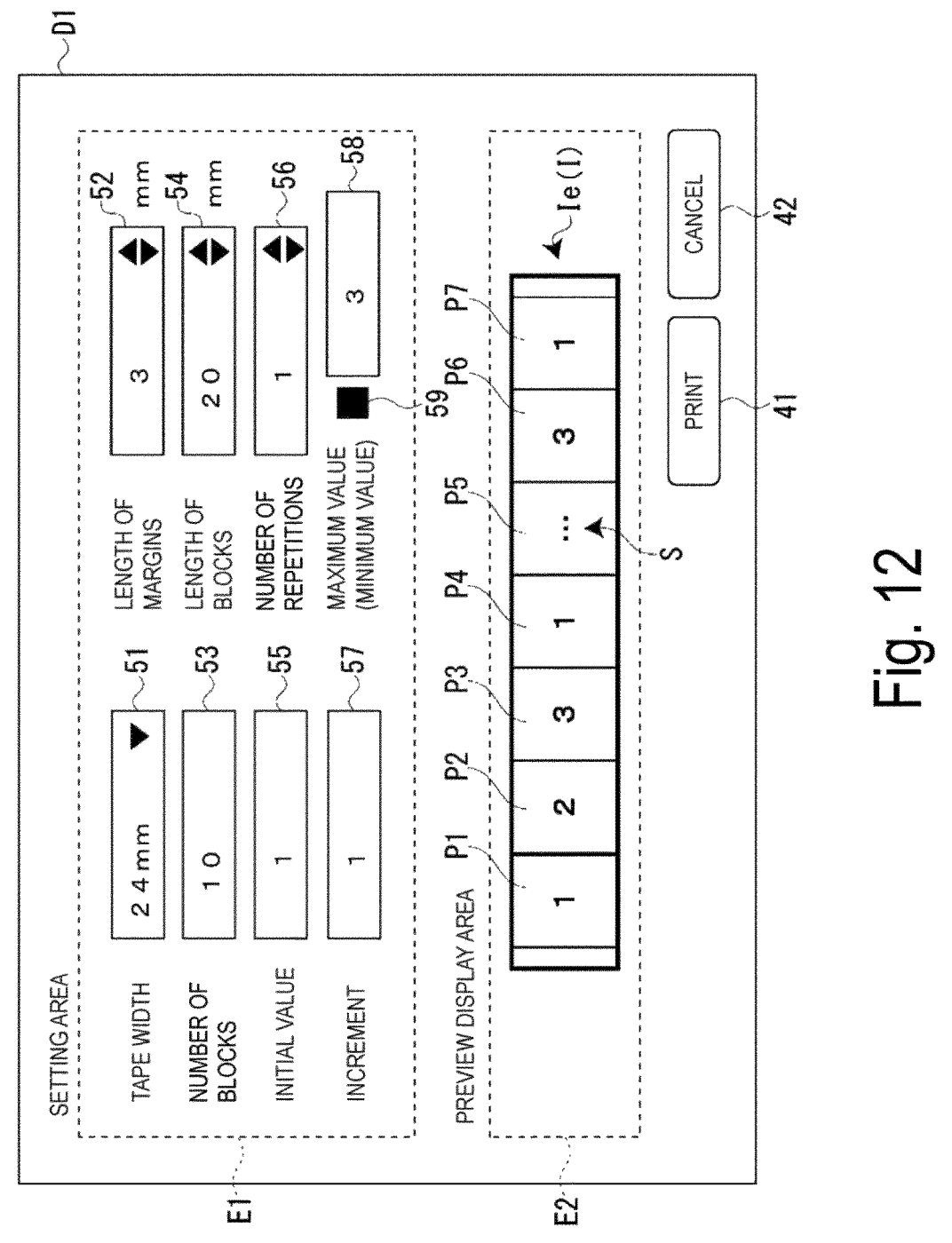

FIG. 12 illustrates a display example of the editing screen D1 in a case where the serial number settings for serial number printing are as follows: the number of blocks: 10, the initial value: 1, the number of repetitions: 1, the increment: 1, and the maximum value or the minimum value: 3. In this case, the plurality of serial number elements for serial number printing are arranged in the order of "1, 2, 3, 1, 2, 3, 1, 2, 3, 1". Thus, FIG. 12 is also an example of the serial number settings that cause the plurality of serial number elements to change cyclically. In FIG. 12, the serial number elements in one cycle are "1, 2, 3". In the case where the block number M>maximum display number N (Yes in S02 in FIG. 4), the maximum value or the minimum value is set (Yes in S04), and at least one of the values of the mathematical expressions A, B, or C is smaller than the maximum display number N (Yes in S07) as above, the PC controller 16 determines the omitted element position using the largest value obtained from the mathematical expressions A, B, and C as described above (see FIG. 5). In the example in FIG. 12, the values of the mathematical expressions A, B, and C are respectively 3, 5, and 5. Thus, the omitted element position is determined as 5. Consequently, the PC controller 16 displays the omission information S at the fifth display position P5 among the seven display positions P1 to P7, and respectively displays the first to fourth, ninth, and tenth serial number elements at the first to fourth, sixth, and seventh display positions P1 to P4, P6, and P7 in a print image Ie in the preview display area E2. That is, the fifth to eighth serial number elements are omitted in the example in FIG. 12.

Figure 13:
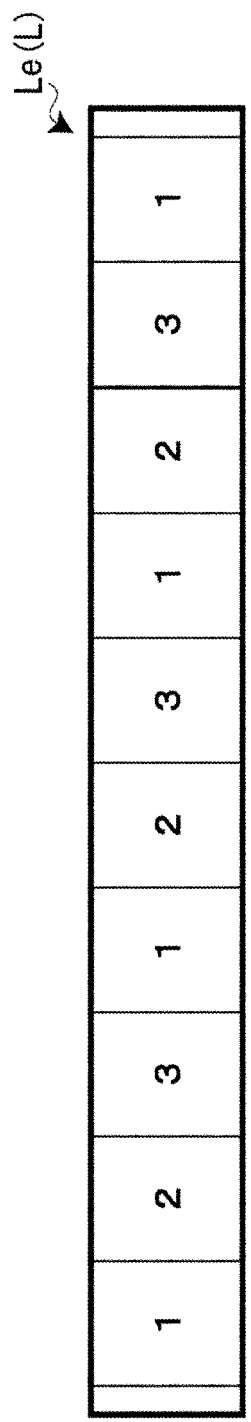
FIG. 13 illustrates an example of a patch panel label created based on the settings on the editing screen in FIG. 12.

FIG. 13 illustrates an example of a patch panel label Le created based on the settings on the editing screen D1 in FIG. 12. A print image including the plurality of serial number elements "1, 2, 3, 1, 2, 3, 1, 2, 3, 1" respectively placed in ten blocks of the patch panel label Le is printed on the patch panel label Le.

Figure 14:
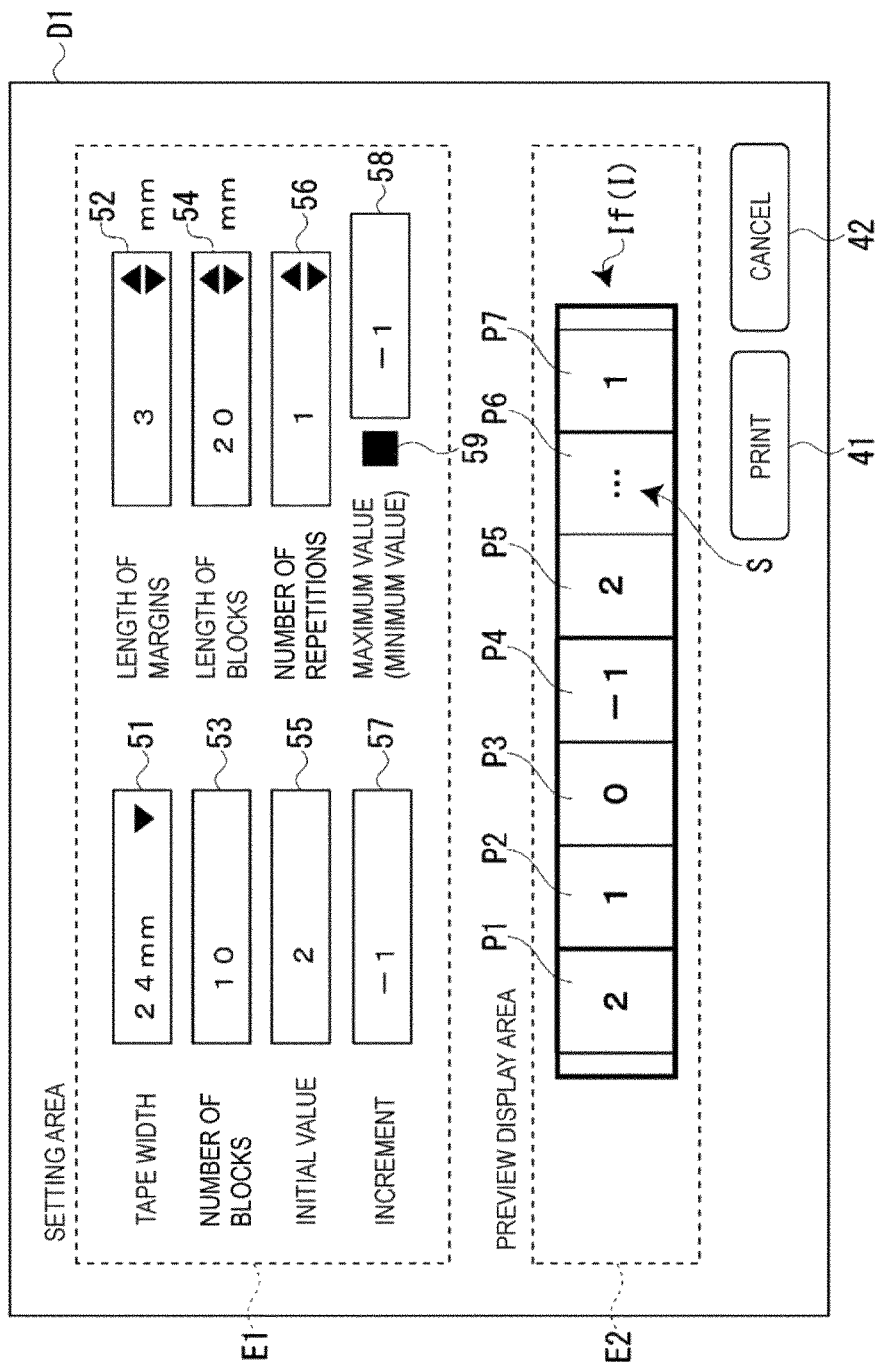
FIG. 14 illustrates a display example of the editing screen.

FIG. 14 illustrates a display example of the editing screen D1 in a case where the serial number settings for serial number printing are as follows: the number of blocks: 10, the initial value: 2, the number of repetitions: 1, the increment: −1, and the maximum value or the minimum value: −1. In this case, the plurality of serial number elements for serial number printing are arranged in the order of "2, 1, 0, −1, 2, 1, 0, −1, 2, 1". In a case where a negative number is included in the serial number elements as above, the omitted element position may also be determined using the omitted element position determination process illustrated in FIGS. 4 and 5. In a case where a value smaller than the initial value is set in the maximum or minimum value setting field 58 (the maximum value or the minimum value<the initial value), the set value serves as the minimum value. In this case, the plurality of serial number elements for serial number printing are arranged in descending order. FIG. 14 is also an example of the serial number settings that cause the plurality of serial number elements to change cyclically. In FIG. 14, the serial number elements in one cycle are "2, 1, 0, −1". In the example in FIG. 14, the values of the mathematical expressions A, B, and C are respectively 3, 6, and 6. Thus, the omitted element position is determined as 6. Consequently, the PC controller 16 displays the omission information S at the sixth display position P6 among the seven display positions P1 to P7, and respectively displays the first to fifth and tenth serial number elements at the first to fifth and seventh display positions P1 to P5 and P7 in a print image If in the preview display area E2. That is, the sixth to ninth serial number elements are omitted in the example in FIG. 14.

Figure 15:
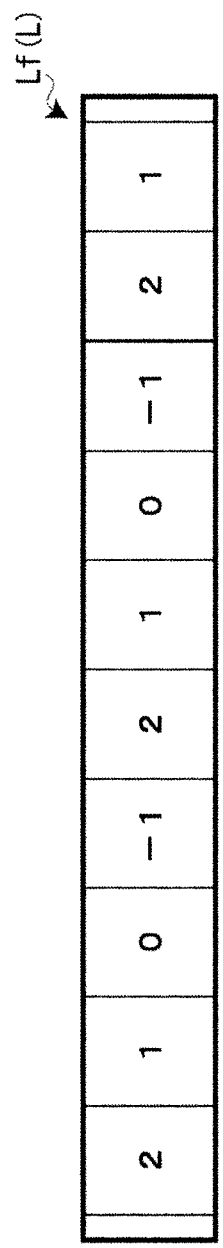
FIG. 15 illustrates an example of a patch panel created based on the settings on the editing screen in FIG. 14.

FIG. 15 illustrates an example of a patch panel label Lf created based on the settings on the editing screen D1 in FIG. 14. A print image including the plurality of serial number elements "2, 1, 0, −1, 2, 1, 0, −1, 2, 1" respectively placed in ten blocks of the patch panel label Lf is printed on the patch panel label Lf.

Figure 16:
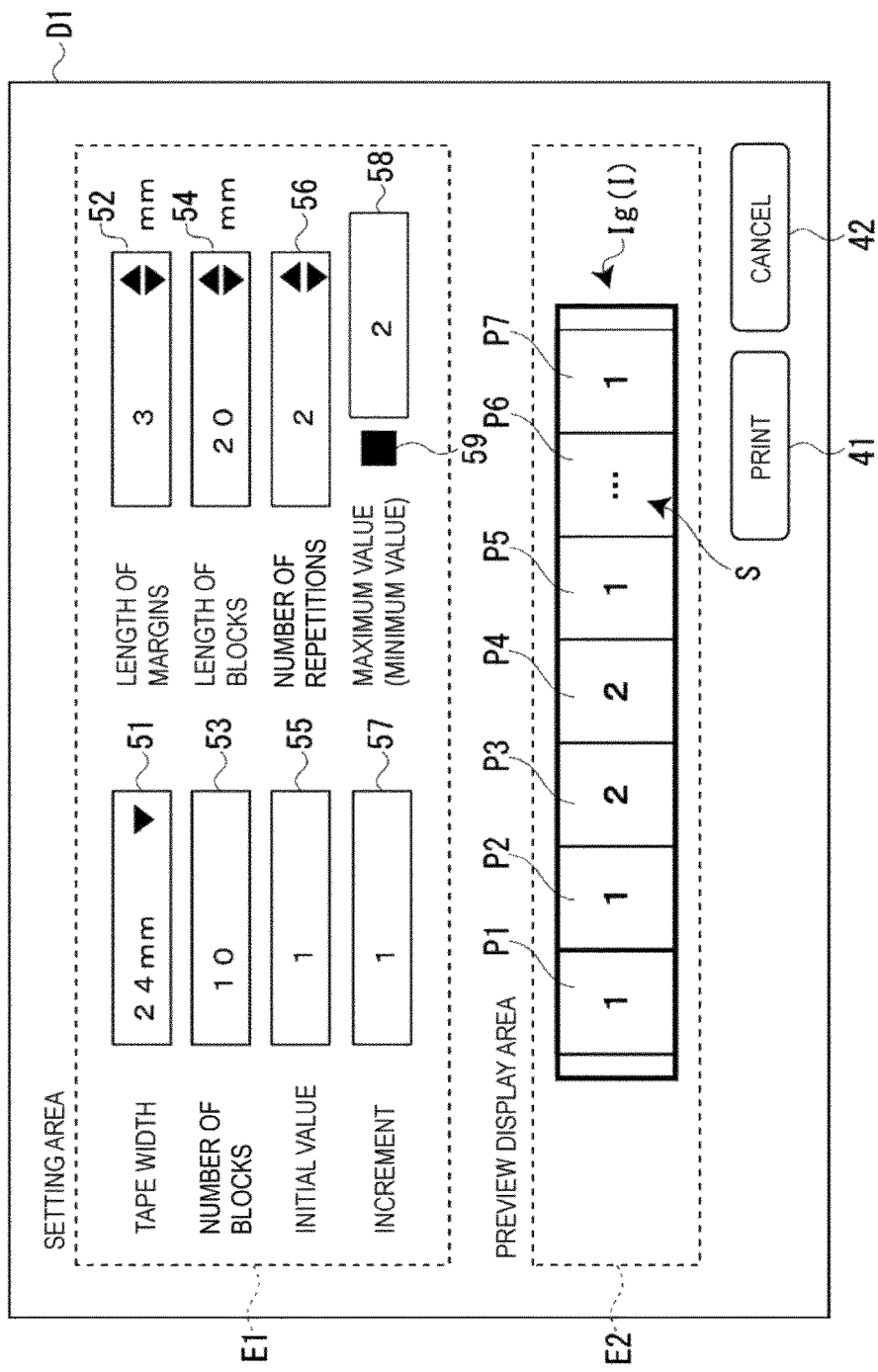
FIG. 16 illustrates a display example of the editing screen.

FIG. 16 illustrates a display example of the editing screen D1 in a case where the serial number settings for serial number printing are as follows: the number of blocks: 10, the initial value: 1, the number of repetitions: 2, the increment: 1, and the maximum value or the minimum value: 2. In this case, the serial number elements are arranged in the order of "1, 1, 2, 2, 1, 1, 2, 2, 1, 1". FIG. 16 is also an example of the serial number settings that cause the plurality of serial number elements to change cyclically. In FIG. 16, the serial number elements in one cycle are "1, 1, 2, 2". In the example in FIG. 16, the values of the mathematical expressions A, B, and C are respectively 4, 4, and 6. Thus, the omitted element position is determined as 6. Consequently, the PC controller 16 displays the omission information S at the sixth display position P6 among the seven display positions P1 to P7, and respectively displays the first to fifth and tenth serial number elements at the first to fifth and seventh display positions P1 to P5 and P7 in a print image Ig in the preview display area E2. That is, the sixth to ninth serial number elements are omitted in the example in FIG. 16.

Figure 17:
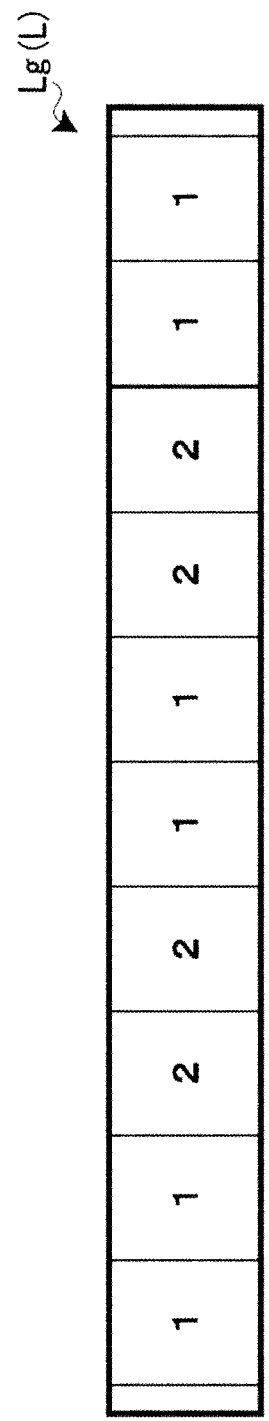
FIG. 17 illustrates an example of a patch panel label created based on the settings on the editing screen in FIG. 16.

FIG. 17 illustrates an example of a patch panel label Lg created based on the settings on the editing screen D1 in FIG. 16. A print image including the plurality of serial number elements "1, 1, 2, 2, 1, 1, 2, 2, 1, 1" respectively placed in ten blocks of the patch panel label Lg is printed on the patch panel label Lg.

Figure 18:
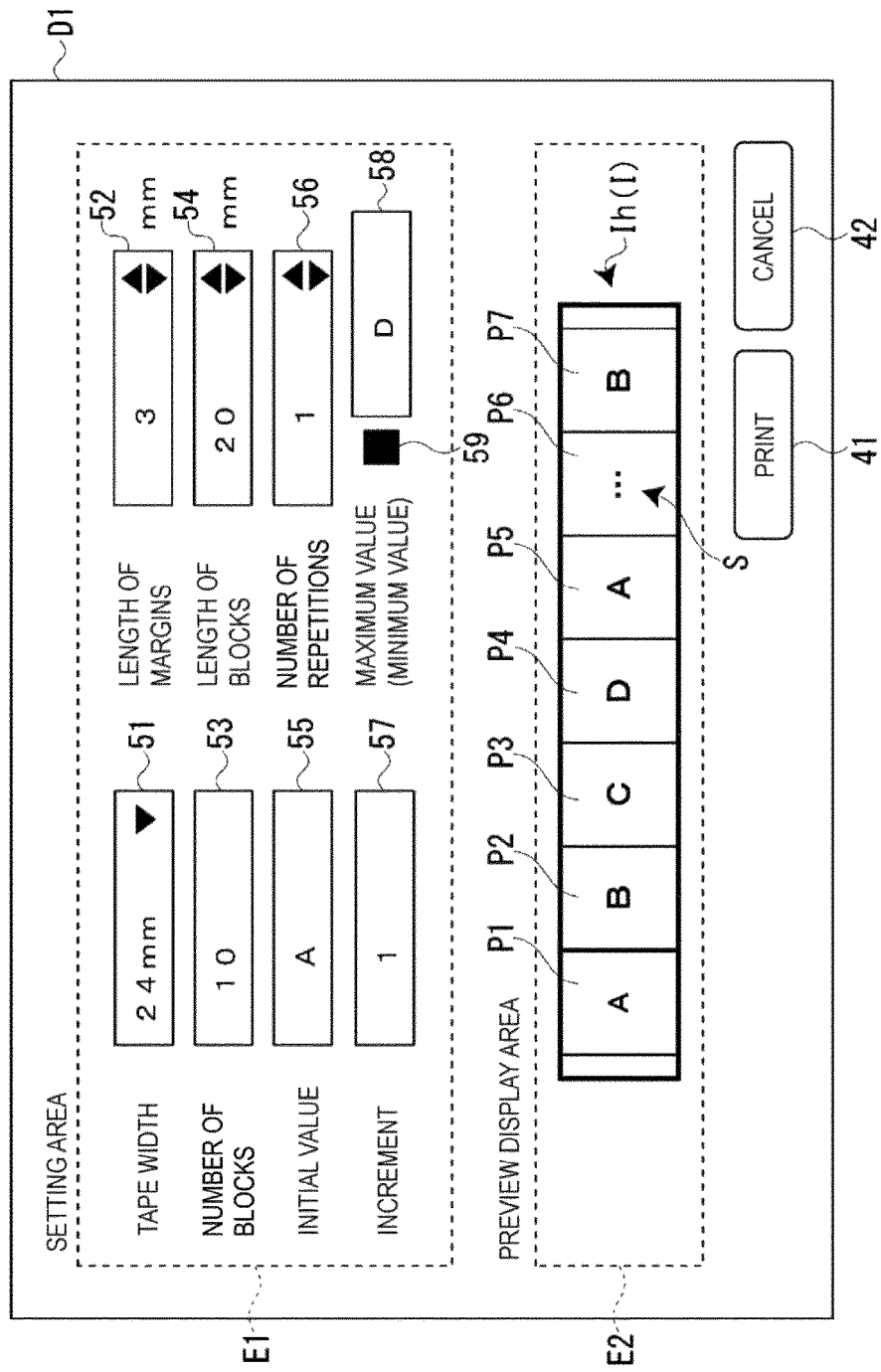
FIG. 18 illustrates a display example of the editing screen.

FIG. 18 illustrates a display example of the editing screen D1 in a case where the serial number settings for serial number printing are as follows: the number of blocks: 10, the initial value: A, the number of repetitions: 1, the increment: 1, and the maximum value or the minimum value: D. In this case, the serial number elements are arranged in the order of "A, B, C, D, A, B, C, D, A, B". FIG. 18 is also an example of the serial number settings that cause the plurality of serial number elements to change cyclically. In FIG. 18, the serial number elements in one cycle are "A, B, C, D". In a case where characters other than numerical values are set as the initial value and the maximum value as in the example in FIG. 18, the omitted element position is determined by replacing the characters with numerical values indicating the order of the characters (for example, A=1 and B=2). As a result, the values of the mathematical expressions A, B, and C are respectively 3, 6, and 6. Thus, the omitted element position is determined as 6. Consequently, the PC controller 16 displays the omission information S at the sixth display position P6 among the seven display positions P1 to P7, and respectively displays the first to fifth and tenth serial number elements at the first to fifth and seventh display positions P1 to P5 and P7 in a print image Ih in the preview display area E2. That is, the sixth to ninth serial number elements are omitted in the example in FIG. 18.

Figure 19:
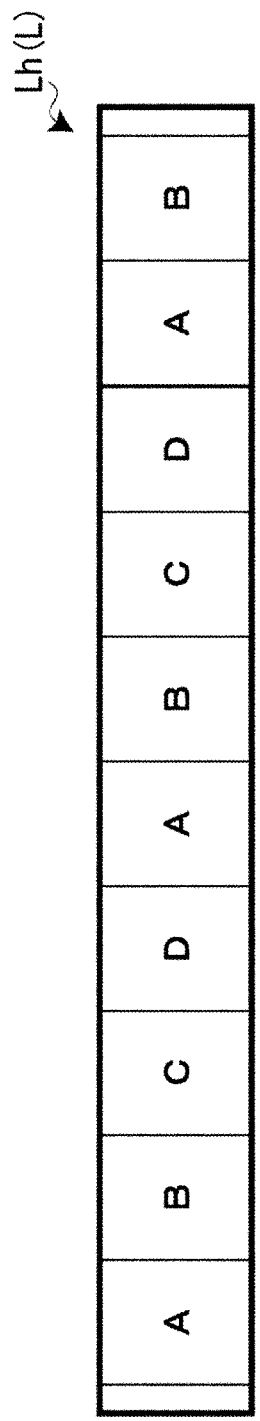
FIG. 19 illustrates an example of a patch panel created based on the settings on the editing screen in FIG. 18.

FIG. 19 illustrates an example of a patch panel label Lh created based on the settings on the editing screen D1 in FIG. 18. A print image including the plurality of serial number elements "A, B, C, D, A, B, C, D, A, B" respectively placed in ten blocks of the patch panel label Lh is printed on the patch panel label Lh.

In accordance with the printing system SY according to some exemplary embodiments, at least two consecutive serial number elements from among the plurality of serial number elements excepting the first and last serial number elements are replaced with the omission information S on the screen when serial number printing is performed. This enables the serial number elements to be displayed in a display area (the preview display area E2 in one exemplary embodiment) that is narrow for the number of serial number elements without reducing the display size of the serial number elements, and thus allows the order of the serial number elements to be readily recognizable to the users. Additionally, the first and last serial number elements displayed among the plurality of serial number elements allow the users to readily identify information including the start value (initial value) and the end value used for serial number printing.

In accordance with the printing system SY according to one exemplary embodiment, the omission information S is displayed in the case where the element number M exceeds the maximum display number N. In the case where the element number M is smaller than or equal to the maximum display number N, the entire plurality of serial number elements are displayed without displaying the omission information. This enables as many serial number elements as possible to be displayed without reducing the display size of the serial number elements, and thus allows the order of the serial number elements to be recognizable to the users more readily.

In accordance with the printing system SY according to one exemplary embodiment, the elements to be omitted may be determined based on the serial number settings for serial number printing to allow the users to check the order of the serial number elements more readily. Specifically, the serial number elements included in the first cycle of serial number printing (more specifically, the serial number elements included in the first cycle and a subsequent serial number element) are excepted from the elements to be omitted. This allows the users to readily check the periodicity of serial number printing. Moreover, the omitted element position is determined based on the serial number settings, and the elements to be omitted are determined based on the omitted element position. This enhances both the appearance of the serial number elements and the omission information S displayed side by side and the recognizability of the serial number elements.

In accordance with the printing system SY according to one exemplary embodiment, the print image I including the serial number elements arranged in order is displayed in the preview display area E2. This provides the users with an at-a-glance view of how the plurality of serial number elements are to be printed.

The disclosure is not limited to the above-described exemplary embodiments, and the following modified examples may be adoptable.

Modified Example 1

In one exemplary embodiment, the PC controller 16 displays the serial number elements arranged in order in the preview display area E2. However, the serial number elements arranged in order may be displayed in an area where supplying data for data supply printing is displayed. Herein, "data supply printing" refers to a printing function based on supplying data 70 created by, for example, retrieving external data.

Figure 20:
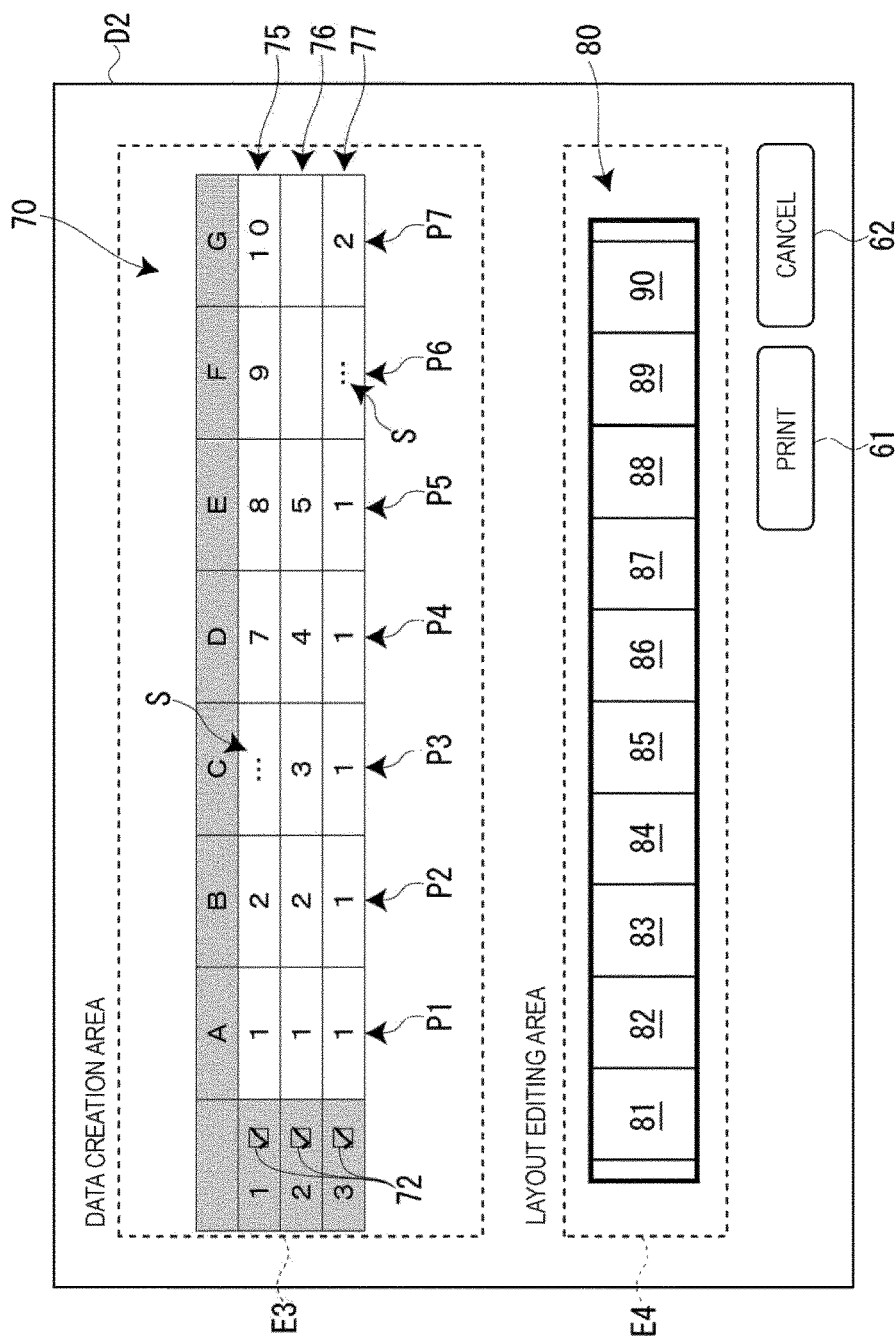
FIG. 20 illustrates a display example of an editing screen according to Modified Example 1.

FIG. 20 illustrates a display example of an editing screen D2 according to Modified Example 1. The editing screen D2 is a screen for editing supplying data, and includes a data creation area E3, a layout editing area E4, a print button 61, and a cancel button 62. The data creation area E3 is an example of "data creation screen". The print button 61 and the cancel button 62 respectively function in a manner similar to the print button 41 and the cancel button 42 in the editing screen D1 (see FIG. 2).

The data creation area E3 is an area for creating the supplying data 70. The supplying data 70 is data for performing serial number printing more than one time, and is created in a table format. In the example in FIG. 20, a plurality of serial number elements for one serial number printing are arranged in a row. In other words, each column corresponds to a display position P. The maximum display number N for a row of the table is set by default or by users. In the example in FIG. 20, the maximum display number N=7. In the case where the element number M>the maximum display number N, the PC controller 16 replaces at least two consecutive serial number elements from among the plurality of serial number elements excepting the first and last serial number elements with the omission information S. The layout editing area E4 is an area for editing the layout of the label L. The supplying position of the supplying data 70 is set in the layout editing area E4. Based on the settings in the example in FIG. 20, the first to tenth serial number elements are to be respectively placed in areas 81 to 90.

The supplying data 70 may be retrieved, for example, from external data indicating a plurality of serial number elements or serial number settings. For example, in a case of data 75 in a first row, data indicating a plurality of serial number elements "1, 2, 3, 4, 5, 6, 7, 8, 9, 10" or data indicating serial number settings "the number of blocks: 10, the initial value: 1, the number of repetitions: 1, the increment: 1, and the maximum value or the minimum value: not set" may be retrieved. The editing screen D2 may be linked to a screen such as the editing screen D1 that enables serial number setting for serial number printing, and the supplying data 70 may be displayed based on the serial number setting on the screen that enables the serial number setting. In the supplying data 70, data 76 in a second row is based on serial number settings "the number of blocks: 5, the initial value: 1, the number of repetitions: 1, the increment: 1, and the maximum value or the minimum value: not set" or a plurality of serial number elements "1, 2, 3, 4, 5". In the case where the element number M<the maximum display number N in this manner, the M serial number elements are displayed at the N display positions P1 to PN from the first column (Column A) in order. Data in a third row is based on serial number settings "the number of blocks: 10, the initial value: 1, the number of repetitions: 5, the increment: 1, and the maximum value or the minimum value: not set" or a plurality of serial number elements "1, 1, 1, 1, 1, 2, 2, 2, 2, 2".

The result of supplying the data in each row may be displayed in the layout editing area E4. In a case where the data 75 in the first row is supply, an image (print preview) of the patch panel label La in FIG. 3 is displayed. In a case where the data 76 in the second row is supplied, an image of the patch panel label Lb in FIG. 7 is displayed. In a case where the data 77 in the third row is supplied, an image of the patch panel label Lc in FIG. 9 is displayed. In data supply printing, in a case where a plurality of data rows are selected (in a case where a plurality of checkboxes 72 are checked) in the data creation area E3, selected data rows may be printed in sequence while being switched. In a case where the data 75, 76, and 77 for the three rows are selected to be printed as illustrated in FIG. 20, the PC controller 16 generates print data for creating the patch panel labels La, Lb, and Lc when the print button 61 is selected, and sends the print data to the tape printing apparatus 2.

In this manner, in the case where supplying data for data supply printing is displayed, the PC controller 16 allows the order of the serial number elements for serial number printing to be readily recognizable to the users. In the example in FIG. 20, the supplying data 70 is illustrated in a table format. However, the data may be displayed in different formats with which the users can grasp how the serial number elements are arranged. For example, in the case of the data 75 in the first row, a string of characters and symbols such as "[1] [2] [ . . . ] [7] [8] [9] [10]" may be displayed as supplying data. In a case where the supplying position of the supplying data 70 is also set in the layout editing area E4, the order of the serial number elements may be displayed using the omission information S (for example, when the data 75 in the first row is supplied, the data may be displayed as in the preview display area E2 in FIG. 2).

Modified Example 2

In some exemplary embodiments, the PC controller 16 displays a horizontal ellipsis as the omission information S. However, symbols other than the horizontal ellipsis ("~", "-", "_") may be used. A character other than a symbol (for example, the first letter of a word meaning "omission") may be displayed as the omission information S. A plurality of symbols or characters (for example, a character string or a word meaning "omission") may also be displayed as the omission information S.

Modified Example 3

Figure 4:
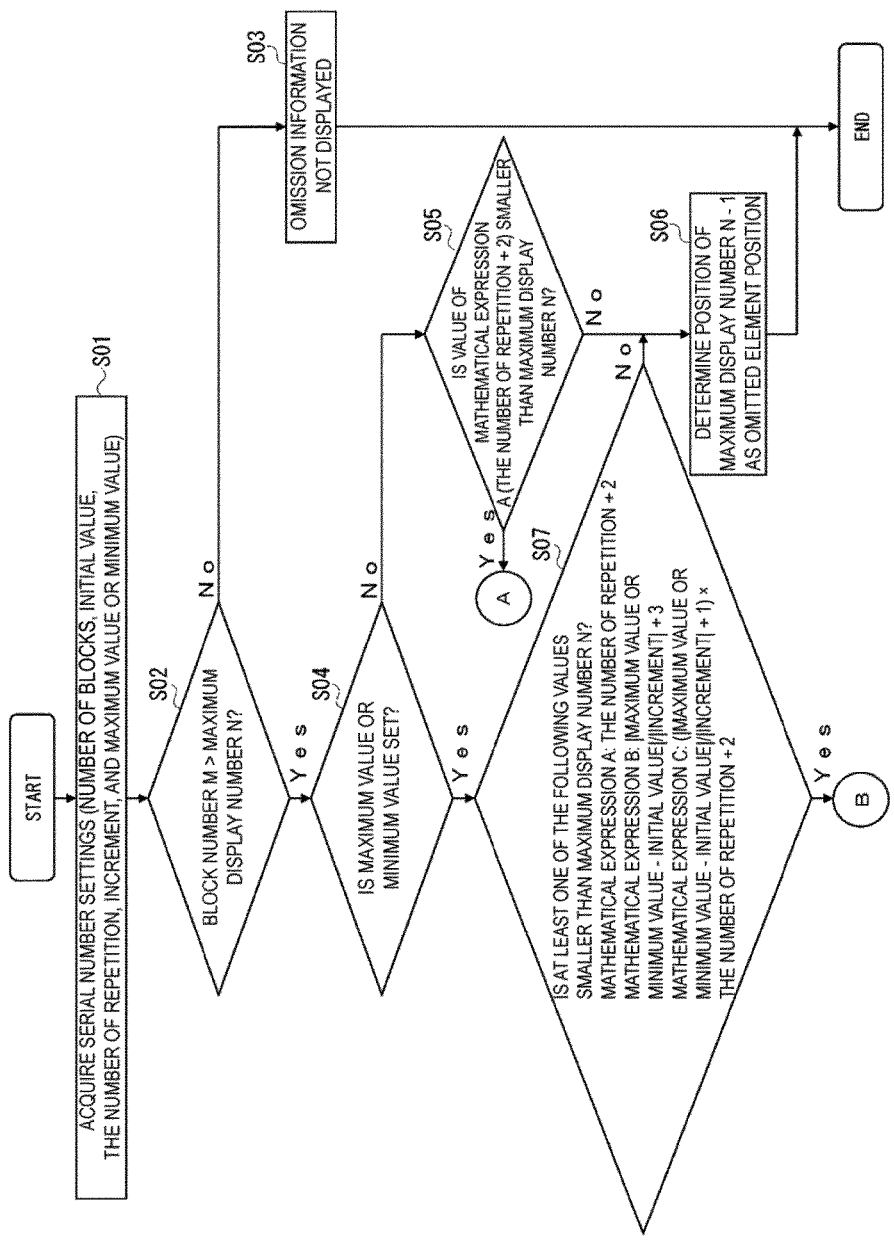
FIG. 4 is a flowchart illustrating a flow of an omitted element position determination process.

In some exemplary embodiments, the PC controller 16 determines the omitted element position using the omitted element position determination process illustrated in FIGS. 4 and 5. However, the omitted element position may be determined based on other algorithms. For example, in the case where the element number M>the maximum display number N, the display position P given by the maximum display number N−1 may be determined as the omitted element position regardless of serial number setting. Moreover, the elements to be omitted, which are determined based on the omitted element position, may be determined based on other algorithms. For example, in the case where the element number M>the maximum display number N, the (M−N+1) serial number elements from the (N−1)th to the (M−1)th may be determined as the elements to be omitted regardless of serial number setting. Moreover, the omission information S may be displayed more than one time. For example, the omission information S may be displayed as follows: "[1] [ . . . ] [5] [ . . . ] [10]". In this case, the number of omission information S and a plurality of omitted element positions may be determined based on the serial number settings.

Modified Example 4

In some exemplary embodiments, labels L for patch panels are created. However, the labels may be created for any device or unit. That is, the disclosure may be applicable to any case involving serial number printing. The disclosure is also applicable to a case where a tape is cut at each serial number element to create an equal number of labels L as the serial number elements.

Modified Example 5

In some exemplary embodiments, serial number elements are printed in serial number printing. However, the disclosure is applicable to a case where a character string (one or more characters) is added to the serial number elements in serial number printing. For example, in a case where a character string "A" is added to a plurality of serial number elements "1, 2, 3, 4, 5, 6, 7, 8, 9, 10", the plurality of serial number elements with the character string may be displayed as follows: "[A1] [A2] [ . . . ] [A7] [A8] [A9] [A10]".

Modified Example 6

In some exemplary embodiments, the PC controller 16 determines the maximum display number N based on the length of the margins and the length of the blocks. However, the maximum display number N may be a fixed value. Moreover, the users may freely set the number of display positions P at which the serial number elements are displayed. In Modified Example 1, the N display positions P1 to PN are horizontally aligned (for example, the preview display area E2 in FIG. 2 and the data creation area E3 in FIG. 20). However, the N display positions P1 to PN may be vertically aligned, or may be aligned in a plurality of lines. Moreover, the N display positions P1 to PN may be arranged in a curved line instead of a straight line.

Modified Example 7

Programs (dedicated application 14b) with which the PC controller 16 (CPU 16a) executes the processes of the PC 1 described in some exemplary embodiments and modified examples, and recording media (such as CD-ROMs and flash memory cards) storing the programs are also included in the scope of the disclosure. The execution of the processes of the PC 1 described in some exemplary embodiments and modified examples may be also achieved by cloud computing. Information processing terminals such as tablet computers and mobile phones may be used instead of the PC 1. The tape printing apparatus 2 may have the functions of the PC 1. In other words, an information processing terminal other than the PC 1 or the tape printing apparatus 2 may be used as a "display control apparatus" of the disclosure. Other modifications and improvements are also possible within the scope of the disclosure.

This application claims priority under 35 U.S.C. § 119 to Japanese Patent Application No. 2017-130568, filed Jul. 3, 2017. The entire disclosure of Japanese Patent Application No. 2017-130568 is hereby incorporated herein by reference.

What is claimed is:

1. A display control apparatus, when a display displays side by side a plurality of serial number elements with a predetermined regularity in order of serial number printing in which the plurality of serial number elements are printed in turn, comprising:
a controller configured to replace at least two consecutive serial number elements from among the plurality of serial number elements excepting first and last serial number elements with omission information, which is a symbol or a character indicating omission of the at least two consecutive serial number elements, and to display the omission information on the display, wherein
in a case where there are N, N being an integer satisfying N≥4, display positions arranged side by side in the display, the plurality of serial number elements being displayed at the respective display positions on a one-by-one basis, and the number M, M being an integer satisfying M≥2, of the plurality of serial number elements satisfies M>N, the controller is configured to replace the at least two serial number elements with the omission information, and displays the omission information on the display, and
in a case where there are N display positions arranged side by side in the display, the plurality of serial number elements being displayed at the respective display positions on a one-by-one basis, and the number M of the plurality of serial number elements satisfies M≤N, the controller is configured to display an entire M plurality of serial number elements on the display without displaying the omission information.

2. The display control apparatus according to claim 1, wherein
the controller is further configured to determine elements to be omitted to be replaceable with the omission information from among the plurality of serial number elements, based on serial number setting for the serial number printing.

3. The display control apparatus according to claim 2, wherein
in a case where the serial number setting causes the plurality of serial number elements to change cyclically, the controller is further configured to except the plurality of serial number elements included in a first cycle from the elements to be omitted.

4. The display control apparatus according to claim 1, wherein
the display is configured to display an editing screen with which print data is edited,
the editing screen includes a preview display screen configured to display a result of editing the print data as a print image, and
the controller is further configured to display the plurality of serial number elements on the preview display screen.

5. The display control apparatus according to claim 1, wherein
the display is configured to display an editing screen with which supplying data for data supply printing is edited,
the editing screen includes a data creation screen with which the supplying data is created, and
the controller is further configured to display the plurality of serial number elements on the data creation screen.

6. A printing apparatus,
when a display side by side a plurality of serial number elements with a predetermined regularity in order of serial number printing in which the plurality of serial number elements are printed in turn, comprising:
a controller configured to replace at least two consecutive serial number elements from among the plurality of serial number elements excepting first and last serial number elements with omission information, which is a symbol or a character indicating omission of the at least two consecutive serial number elements, and to display the omission information on the display; and a printing unit configured to perform the serial number printing, wherein in a case where there are N, N being an integer satisfying N≥4, display positions arranged side by side in the display, the plurality of serial number elements being displayed at the respective display positions on a one-by-one basis, and the number M, M being an integer satisfying M≥2, of the plurality of serial number elements satisfies M>N, the controller is configured to replace the at least two serial number elements with the omission information, and displays the omission information on the display, and in a case where there are N display positions arranged side by side in the display, the plurality of serial number elements being displayed at the respective display positions on a one-by-one basis, and the number M of the plurality of serial number elements satisfies M≤N, the controller is configured to display an entire M plurality of serial number elements on the display without displaying the omission information.

7. A method of controlling a display control apparatus, the method comprising:

displaying a plurality of serial number elements with a predetermined regularity on a display in order of serial number printing in which the plurality of serial number elements are printed in turn;

replacing at least two consecutive serial number elements from among the plurality of serial number elements excepting first and last serial number elements with omission information, which is a symbol or a character indicating omission of the at least two consecutive serial number elements; and displaying the omission information on the display, wherein in a case where there are N, N being an integer satisfying N≥4, display positions arranged side by side in the display, the plurality of serial number elements being displayed at the respective display positions on a one-by-one basis, and the number M, M being an integer satisfying M≥2, of the plurality of serial number elements satisfies M>N, the at least two serial number elements are replaced with the omission information, and the omission information is displayed on the display, and in a case where there are N display positions arranged side by side in the display, the plurality of serial number elements being displayed at the respective display positions on a one-by-one basis, and the number M of the plurality of serial number elements satisfies M≤N, an entire M plurality of serial number elements is displayed on the display without displaying the omission information.

8. A non-transitory computer readable medium storing a program for causing a computer to perform a process, the process comprising:

displaying a plurality of serial number elements with a predetermined regularity on a display in order of serial number printing in which the plurality of serial number elements are printed in turn;

replacing at least two consecutive serial number elements from among the plurality of serial number elements excepting first and last serial number elements with omission information, which is a symbol or a character indicating omission of the at least two consecutive serial number elements; and displaying the omission information on the display, wherein in a case where there are N, N being an integer satisfying N≥4, display positions arranged side by side in the display, the plurality of serial number elements being displayed at the respective display positions on a one-by-one basis, and the number M, M being an integer satisfying M≥2, of the plurality of serial number elements satisfies M>N, the at least two serial number elements are replaced with the omission information, and the omission information is displayed on the display, and in a case where there are N display positions arranged side by side in the display, the plurality of serial number elements being displayed at the respective display positions on a one-by-one basis, and the number M of the plurality of serial number elements satisfies M≤N, an entire M plurality of serial number elements is displayed on the display without displaying the omission information.

* * * * *